(12) United States Patent
Lobson et al.

(10) Patent No.: US 11,073,246 B2
(45) Date of Patent: Jul. 27, 2021

(54) PROPANE TANK SEAT ACCESSORY

(71) Applicants: Craig Lobson, Winnipeg (CA); Bryan Ratchenski, Cavalier, ND (US); Garrett Masloski, Pembina, ND (US)

(72) Inventors: Craig Lobson, Winnipeg (CA); Bryan Ratchenski, Cavalier, ND (US); Garrett Masloski, Pembina, ND (US)

( * ) Notice: Subject to any disclaimer, the term of this patent is extended or adjusted under 35 U.S.C. 154(b) by 138 days.

(21) Appl. No.: 16/563,021

(22) Filed: Sep. 6, 2019

(65) Prior Publication Data
US 2020/0109819 A1 Apr. 9, 2020

Related U.S. Application Data

(60) Provisional application No. 62/743,047, filed on Oct. 9, 2018.

(51) Int. Cl.
*F17C 13/08* (2006.01)
*F16J 13/00* (2006.01)

(52) U.S. Cl.
CPC ............ *F17C 13/084* (2013.01); *F16J 13/00* (2013.01); *F17C 2201/0104* (2013.01); *F17C 2205/0103* (2013.01); *F17C 2205/0126* (2013.01); *F17C 2205/0308* (2013.01); *F17C 2221/035* (2013.01)

(58) Field of Classification Search
CPC .. F16J 13/00; F16J 13/02; B65D 25/20; F17C 13/084; F17C 13/08
USPC .............. 220/582, 581, 735, 729, 212, 694; 297/463.1
See application file for complete search history.

(56) References Cited

U.S. PATENT DOCUMENTS

| | | | | |
|---|---|---|---|---|
| 2,357,046 A | * | 8/1944 | Hewitt | A47C 3/18 297/461 |
| 5,261,559 A | * | 11/1993 | Salvucci, Sr. | F17C 13/085 137/382 |
| 7,322,487 B1 | | 1/2008 | Hill | |
| 7,618,695 B2 | * | 11/2009 | Snashall | F17C 1/14 220/581 |
| 7,950,544 B2 | * | 5/2011 | Blossom | A47B 97/00 220/634 |
| 8,720,738 B1 | | 5/2014 | Ryman | |

* cited by examiner

*Primary Examiner* — Robert J Hicks
(74) *Attorney, Agent, or Firm* — Ryan W. Dupuis; Kyle R. Satterthwaite; Ade & Company Inc.

(57) ABSTRACT

A propane tank seat accessory device provides an upper seating surface to support a user seated thereon on a portable propane tank with a cylindrical body and a protective cage surrounding a valve at the top end thereof. The device has a seat with a lower supporting surface for being supported on an upper edge of the protective cage and which defines the upper seating surface thereon. A sleeve extends downwardly from the lower supporting surface having an exterior diameter receivable within the protective cage of the propane tank in which a bottom end of the sleeve can be engaged upon the top end of the tank body. The sleeve has a valve opening therein for communication of the valve structure therethrough.

14 Claims, 3 Drawing Sheets

PROPANE TANK SEAT ACCESSORY

This application claims the benefit under 35 U.S.C. 119(e) of U.S. provisional application Ser. No. 62/743,047, filed Oct. 9, 2019.

FIELD OF THE INVENTION

The invention relates to a seat accessory for use with a portable propane tank, and more particularly, to a seat accessory which can be supported on an upright cylindrical propane tank to provide a seating surface upon which a user can be seated.

BACKGROUND

Portable propane tanks of the type comprising an upright cylindrical body with a valve structure at the top end of the tank which is surrounded by a protective cage are commonly used to provide fuel to a variety of propane fuelled devices including heaters and the like. In many instances, the propane fuelled devices and the propane tanks are to be located in space constrained environments where it is desirable for the propane tank to serve a dual purpose. One such example is the use of portable propane tanks to provide fuel to a portable propane heater of the type used within an ice fishing shack.

U.S. Pat. No. 7,322,487 by Hill discloses an example of a propane tank cover that defines a tabletop so that the propane tank effectively functions as the pedestal of a table. In order to adequately secure the device to a propane tank, a mounting collar must be clamped externally about the protective cage of the propane tank in a manner which can restrict access to the valve structure of the tank. Any restricted access to the valve structure is undesirable in the event that the valve must be urgently shut off, for example to prevent an uncontrolled fire.

U.S. Pat. No. 8,720,738 by Ryman discloses another example of a propane tank cover; however, the cover must also be coupled to the tank in a secure manner which can restrict access to the valve structure in an undesirable manner.

SUMMARY OF THE INVENTION

According to one aspect of the invention there is provided a propane tank seat accessory device for use with a portable propane tank having an upright cylindrical body with an upper spherical cap, a valve structure extending upwardly from the upper spherical cap, a protective cage surrounding the valve structure so as to extend upwardly from the upper spherical cap to an upper edge lying in a plane which is generally perpendicular to an upright axis of the cylindrical body, the device comprising:

a seat having a lower supporting surface for being supported above the upper edge of the protective cage and an upper seating surface arranged to support a user thereon, and a sleeve extending downwardly from the lower supporting surface of the seat so as to be arranged to centrally locate the seat relative to the propane tank;

the sleeve having an exterior diameter arranged to be received within the protective cage of the propane tank;

the sleeve having an interior diameter adapted to receive the valve structure therein; and the sleeve having a valve opening therein for communication of the valve structure therethrough.

Use of a sleeve which is integrally joined to a seat surface thereabove and which fits within the interior diameter of the protective cage allows the seat surface to be adequately secured relative to the propane tank in a manner that allows a user to safely sit upon the seat, while still enabling the propane tank seat accessory device to be readily removed from the tank simply by lifting the device vertically upward off the tank.

Preferably the seat comprises an upper panel defining the upper seating surface and a lower panel defining the lower supporting surface which is annular in shape so as to span from an outer perimeter of the upper panel to the sleeve.

According to a second aspect of the present invention there is provided a method of forming the propane tank seat accessory device including the steps of:

rotationally moulding the upper panel of the seat, the lower panel of the seat and the sleeve as a unitary plastic structure.

Preferably, the upper and lower panels are joined to one another about a full circumference of the outer perimeter such that the upper panel is spaced above the lower panel and the sleeve and is only supported by a perimeter wall connecting the upper panel to the lower panel at the outer perimeter of the upper panel.

Preferably, the lower panel is arranged to be engaged upon the upper edge of the protective cage; however, in other instances the bottom edge of the sleeve and gazed upon the upper spherical cap of the tank is sufficient to support the seat on the propane tank.

The lower panel may be flat and perpendicular to an upright axis of the sleeve.

The seat and the sleeve may be integrally formed of a commonly plastic material such that the seat and the sleeve are seamlessly connected as a unitary structure.

According to a preferred embodiment the seat has an outer diameter which is approximately equal to an outer diameter of the propane tank.

Preferably a bottom edge of the sleeve is adapted to engage the upper spherical cap. When the sleeve is approximately equal in height to the protective cage, the bottom edge of the sleeve may be adapted to engage the upper spherical cap when the lower supporting surface of the seat is engaged upon the upper edge of the protective cage.

The sleeve may be reduced in height relative to the protective cage so as to be adapted to engage the upper spherical cap at a location spaced radially inwardly from the connection of the protective cage to the upper spherical cap.

Preferably the valve opening is open to a bottom edge of the sleeve. In this manner, the device can be readily removed by upward lifting off of the tank while the propane tank remains connected to a fuel line through the valve structure.

Preferably the valve opening has an upper portion defining a first width in a circumferential direction of the sleeve for communication of the valve structure therethrough, and a lower portion open to the bottom edge of the sleeve having a second width in the circumferential direction of the sleeve which is less than said first width. This allows maximizing the support of the sleeve being engaged upon the tank about a large portion of the circumference while maintaining a large opening to have access to the valve structure.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
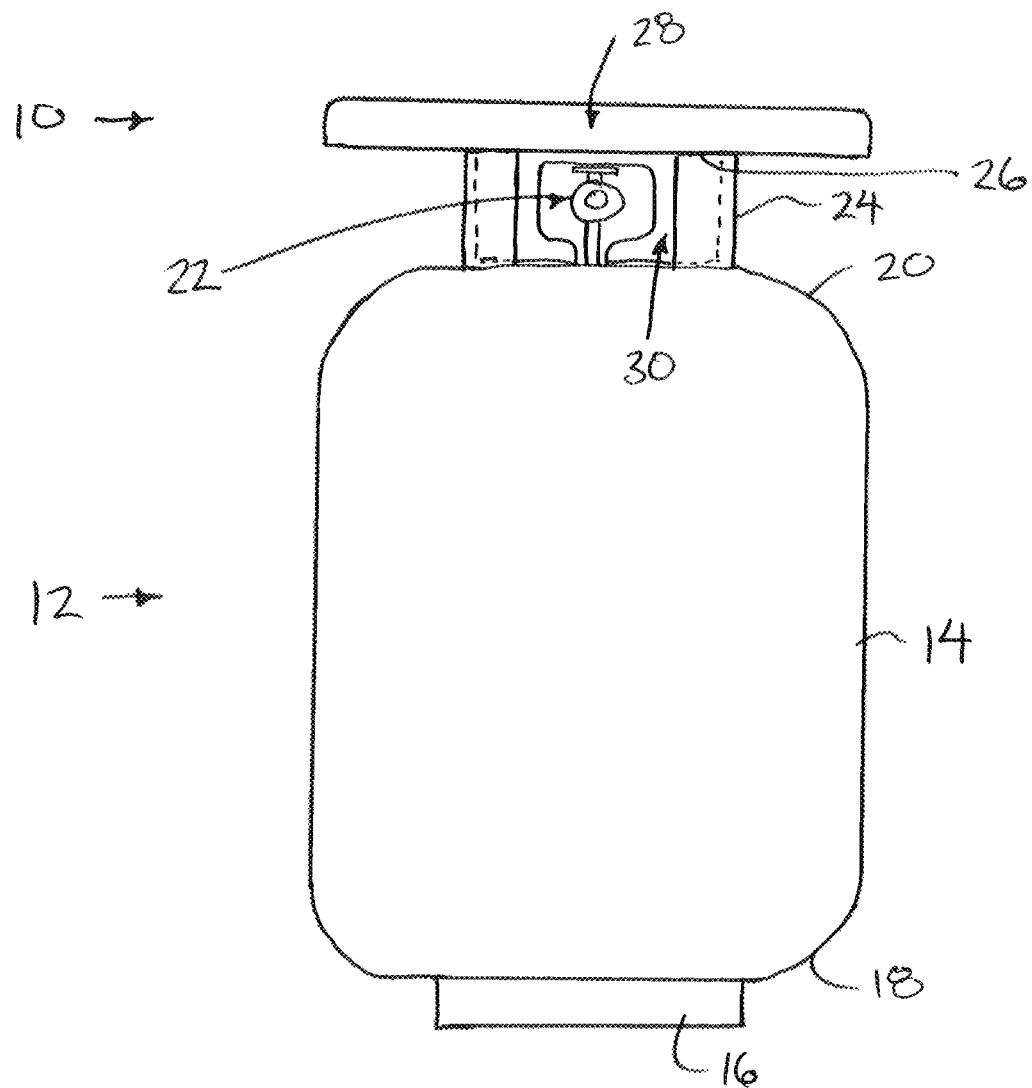
FIG. 1 is a front elevational view of a propane tank supporting the seat accessory thereon.
Figure 3:
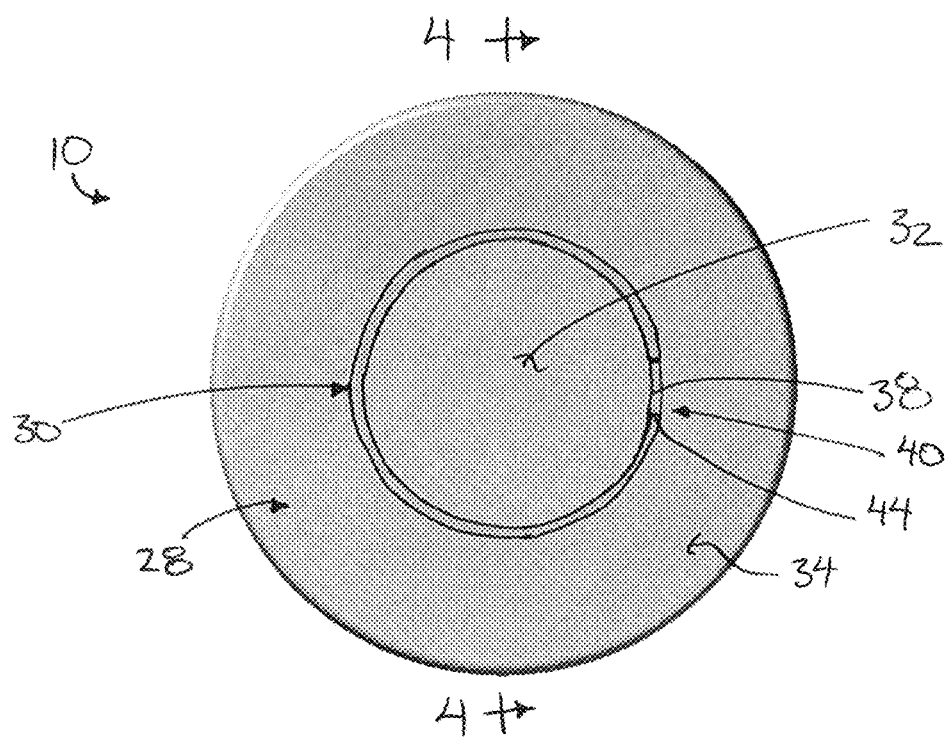
FIG. 3 is a bottom plan view of the seat accessory.
Figure 2:
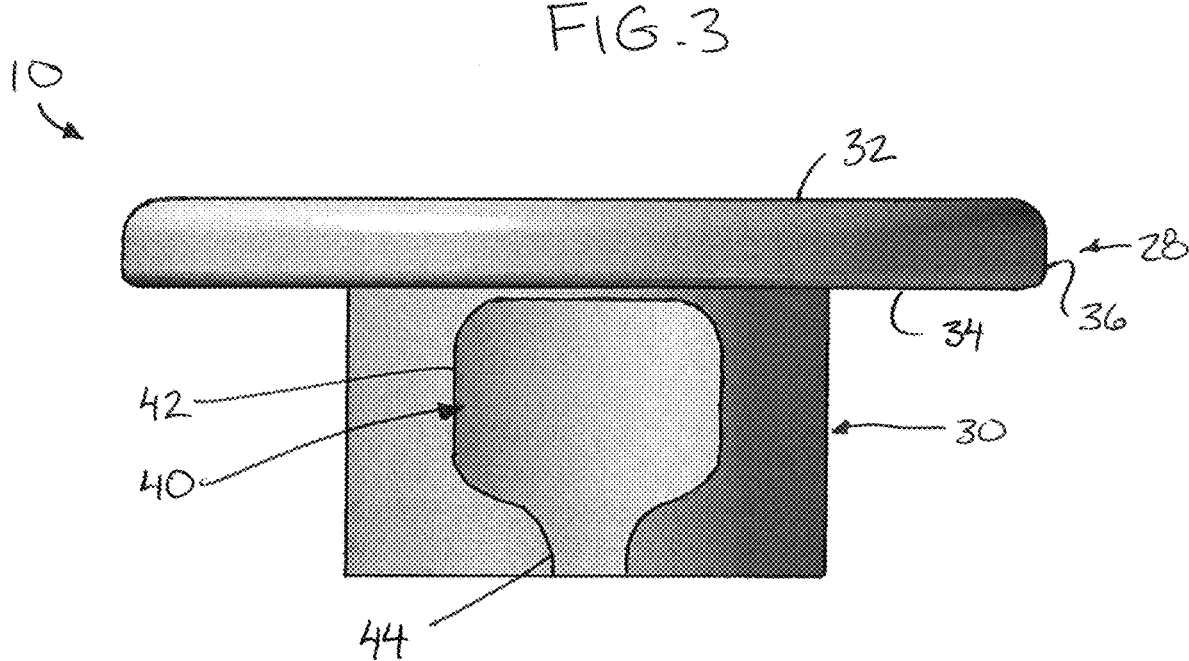
FIG. 2 is a front elevational view of the seat accessory removed from the propane tank.
Figure 5:
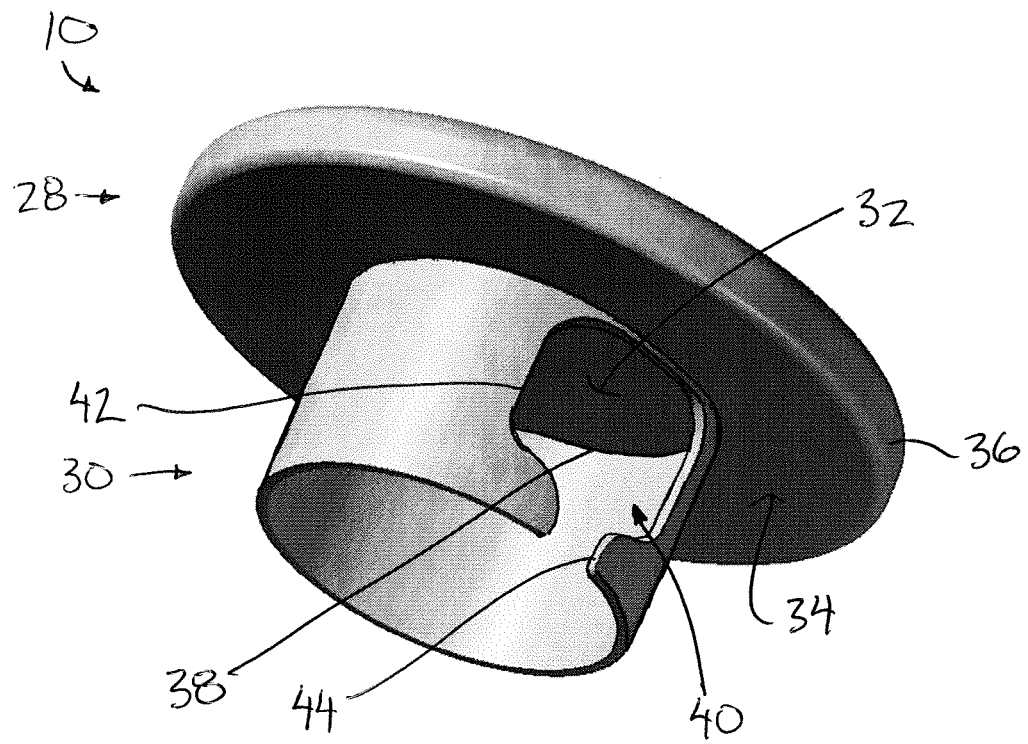
FIG. 5 is a perspective view showing a bottom and a front of the seat accessory.
Figure 4:
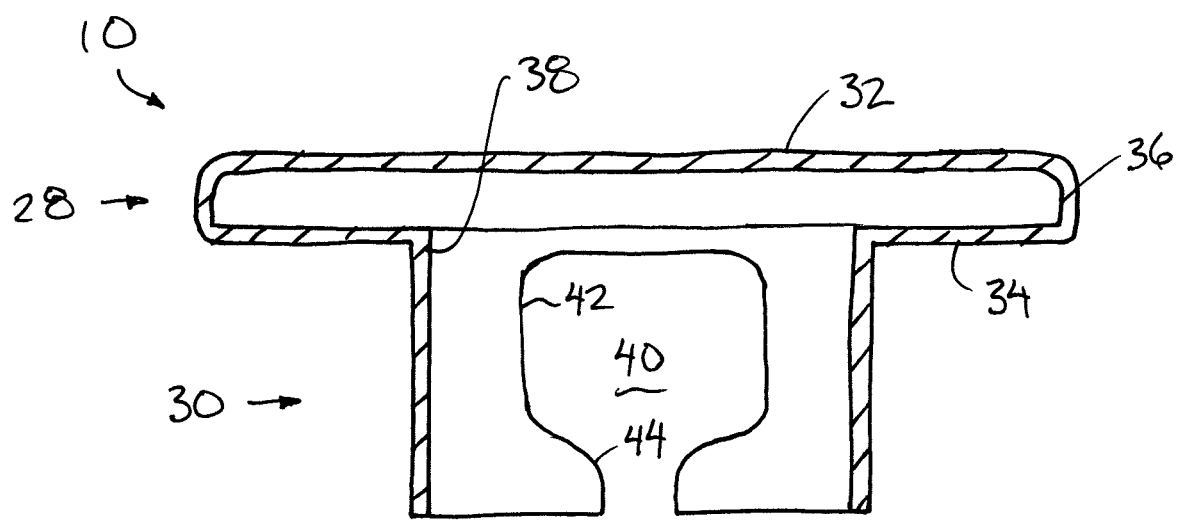
FIG. 4 is a sectional view along the line 4-4 in FIG. 3.

Referring to the accompanying figures there is illustrated a propane tank seat accessory device generally indicated by reference numeral 10. The device 10 is particularly suited for use with a portable propane tank 12 of the type which is commonly used to provide propane fuel various propane fuelled appliances such as a propane barbecue or a propane heater for example.

More particularly, the propane tank 12 includes a cylindrical tank body 14 having a side wall which is cylindrical about an upright axis and which is enclosed at opposing top and bottom ends by an upper spherical cap 16 and a lower spherical cap 18 respectively. A base ring in the form of a cylindrical collar 20 is typically mounted on the bottom of the lower spherical cap to provide a level bottom edge for supporting the tank body in an upright orientation on a level supporting surface.

A valve structure 22 is mounted centrally in the upper spherical cap 16. The valve structure includes a valve body supporting a valve member therein which is movable between open and closed positions by rotating an external handle on the valve body in the usual manner of a conventional portable propane tank. The valve body includes a threaded outlet which typically supports a pressure regulator thereon. the pressure regulator in turn provides a threaded connector for releasable connection to a fuel line which couples the tank 12 to a propane fuelled appliance.

A protective cage 24 surrounds and protects the valve structure 22. The cage typically comprises a perimeter wall forming a partial cylindrical shape, in which the perimeter wall is supported concentrically with the tank body 14 to extend upwardly from the upper spherical cap 16 of the tank to a respective upper edge 26 of the cage. The upper edge 26 of the cage lies in a plane which is perpendicularly to the upright axis of the tank body. The cage typically includes an open side to provide access to the valve structure and a fuel line communicating therethrough while the cage at least partially surrounds the valve structure. One or more handle openings is also typically provided within the cylindrical wall of the cage so that the tank may be readily grasped in the hand of the user for handling of the tank.

The device 10 according to the present invention generally includes a seat portion 28 which is intended to be supported above the cage 24 of the tank to provide an upper seating surface at a top thereof upon which a user may be seated, and a sleeve 30 extending downwardly from the seat portion 28 to be received within the protective cage 24 of the tank to centrally locate the seat portion 28 relative to the propane tank.

The seat portion 28 includes an upper panel 32 defining the flat upper seating surface upon which a user may be seated in use. The upper panel 32 includes an outer perimeter having an outer diameter which is approximately equal to the outer diameter of the propane tank upon which the device is seated. The upper panel 32 is fully suspended across the full diameter of the seat portion so as to be supported only at the outer perimeter edge of the upper panel.

The upper panel 32 of the seat portion is joined to a lower panel 34 spaced therebelow by a perimeter wall 36 which is joined between the upper and lower panels so as to be generally cylindrical in shape while joining the upper and lower panels about the full circumference of the seat portion. The lower panel 34 is generally flat so as to be parallel to the upper panel 32 thereabove. The lower panel is generally annular in shape so as to span radially inwardly from the perimeter wall at the outer perimeter to an inner edge 38 surrounding a central opening in the lower panel. The bottom of the lower panel defines a flat lower supporting surface adapted to be engaged upon the upper edge of the cage of the propane tank in a typical installed configuration. An inner diameter of the central opening in the lower panel is less than the interior diameter of the cage on the tank so as to ensure that the lower panel can be engaged upon the upper edge of the cage.

The sleeve 30 is generally cylindrical in shape about an upright axis oriented perpendicularly to the seat thereabove while being generally concentrically aligned with the seat. The cylindrical wall forming the sleeve 30 is joined at the top edge to the inner edge 38 of the lower panel such that the interior diameter of the sleeve is equal to the interior diameter of the central opening in the lower panel. The sleeve 30 extends downward from the lower panel of the seat to a bottom edge of the sleeve which lies in a plane oriented perpendicularly to the axis of the sleeve and parallel to the seat thereabove. The outer diameter of the sleeve fits within the interior diameter of the protective cage of the tank while the interior diameter of the sleeve is sufficiently large to fully surround the valve structure within the cage. Preferably, the outer diameter of the sleeve is very near to the inner diameter of the cage.

A valve opening 40 is provided in the side wall of the sleeve 30 for alignment with the open side of the protective cage. This allows communication of the valve structure and a fuel line connected to the valve structure through the valve opening in the sleeve in the mounted configuration. The valve opening includes an upper portion 42 having a height spanning a majority of the height of the sleeve with a first width in the circumferential direction which is near to the dimension of the open side of the protective cage in the circumferential direction. The valve opening also includes a lower portion 44 below the upper portion in which the width of the valve opening in the circumferential direction tapers inwardly to be reduced toward the bottom edge of the sleeve. The lower portion 44 of the valve opening is open through to the bottom edge. The width in the circumferential direction of the lower portion of the valve opening is at its smallest at the bottom edge where a second width is defined which is much less than the first width of the upper portion 42 of the valve opening. The second width of the lower portion remain sufficiently large to accommodate a fuel line being received therethrough while maximizing the length of the bottom edge of the sleeve in the circumferential direction for support against the upper spherical cap of the tank.

The height of the sleeve 30 is preferably near or slightly less than the height of the protective cage of the tank. In this manner the bottom edge of the sleeve is preferably engaged upon the spherical cap of the tank at a location spaced radially inward from the connection of the protective cage to the upper spherical cap of the tank, while at the same time the lower supporting surface of the lower panel 34 is engaged upon the upper edge of the protective cage.

Depending upon the type of tank upon which the device 10 is supported, in some instances the sleeve height may be greater than the height of the protective cage such that the seat is supported on the tank primarily by engagement of the bottom edge of the sleeve upon the upper spherical cap of the tank while the sleeve functions to locate the seat portion generally concentrically with the propane tank. In other instances, the sleeve height may be smaller than the height of the protective cage to the degree that the seat portion is only supported on the tank by engagement of the lower panel 34 on the top edge of the cage so that the sleeve only serves to centrally locate the seat relative to the tank.

In all instances, the load of a user on the upper panel 32 of the seat portion is carried through the perimeter wall 36 to the lower panel which is in turn supported at the inner edge 38 thereof relative to the tank either by (i) direct engagement of the lower panel on the upper edge of the cage, or (ii) engagement of the bottom end of the sleeve on the upper spherical cap of the tank, or (iii) a combination thereof. The hollow structure of the seat portion in which the upper panel 32 is suspended above the lower panel enables some limited degree of flexing of the seat portion under the weight of the user to provide some degree of comfort.

The device 10 is typically manufactured as a single unitary structure which is integrally moulded of a common plastic material. Preferably, the entirety of the seat portion including the upper panel and the lower panel are formed together with the sleeve 30 as a single unitary, seamless, integral structure by rotational moulding in a single mould. Some additional finishing steps such as the formation of the valve opening 40 may be formed in the moulding step, or as a subsequent step involving some machining of the moulded structure.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A propane tank seat accessory device for use with a portable propane tank having an upright cylindrical body with an upper spherical cap, a valve structure extending upwardly from the upper spherical cap, a protective cage surrounding the valve structure so as to extend upwardly from the upper spherical cap to an upper edge lying in a plane which is generally perpendicular to an upright axis of the cylindrical body, the device comprising:
    a seat having a lower supporting surface for being supported above the upper edge of the protective cage and an upper seating surface arranged to support a user thereon, and
    a sleeve extending downwardly from the lower supporting surface of the seat so as to be arranged to centrally locate the seat relative to the propane tank;
    the sleeve having an exterior diameter arranged to be received within the protective cage of the propane tank;
    the sleeve having an interior diameter adapted to receive the valve structure therein; and
    the sleeve having a valve opening therein for communication of the valve structure therethrough.

2. The device according to claim 1 wherein the seat comprises an upper panel defining the upper seating surface and a lower panel defining the lower supporting surface which is annular in shape so as to span from an outer perimeter of the upper panel to the sleeve.

3. The device according to claim 2 wherein the upper and lower panels are joined to one another about a full circumference of the outer perimeter.

4. The device according to claim 2 wherein the upper panel is spaced above the lower panel and the sleeve and is only supported by a perimeter wall connecting the upper panel to the lower panel at the outer perimeter of the upper panel.

5. The device according to claim 1 wherein the lower panel is arranged to be engaged upon the upper edge of the protective cage.

6. The device according to claim 1 wherein the lower panel is flat and perpendicular to an upright axis of the sleeve.

7. The device according to claim 1 wherein the seat and the sleeve are integrally formed of a commonly plastic material such that the seat and the sleeve are seamlessly connected as a unitary structure.

8. The device according to claim 1 wherein the seat has an outer diameter which is approximately equal to an outer diameter of the propane tank.

9. The device according to claim 1 wherein a bottom edge of the sleeve is adapted to engage the upper spherical cap.

10. The device according to claim 9 wherein the sleeve is approximately equal in height to the protective cage such that the bottom edge of the sleeve is adapted to engage the upper spherical cap when the lower supporting surface of the seat is engaged upon the upper edge of the protective cage.

11. The device according to claim 10 wherein the sleeve is reduced in height relative to the protective cage so as to be adapted to engage the upper spherical cap at a location spaced radially inwardly from the connection of the protective cage to the upper spherical cap.

12. The device according to claim 1 wherein the valve opening is open to a bottom edge of the sleeve.

13. The device according to claim 1 wherein the valve opening has an upper portion defining a first width in a circumferential direction of the sleeve for communication of the valve structure therethrough, and a lower portion open to the bottom edge of the sleeve having a second width in the circumferential direction of the sleeve which is less than said first width.

14. A method of forming the device according to claim 2 including the steps of:
    rotationally moulding the upper panel of the seat, the lower panel of the seat and the sleeve as a unitary plastic structure.

* * * * *